United States Patent [19]

Booker

[11] Patent Number: 4,506,426

[45] Date of Patent: Mar. 26, 1985

[54] POCKET CLIP FOR A WRITING INSTRUMENT

[75] Inventor: Brian A. J. Booker, East Sussex, England

[73] Assignee: The Parker Pen Company, Janesville, Wis.

[21] Appl. No.: 527,772

[22] Filed: Aug. 30, 1983

[51] Int. Cl.[3] .............................................. B23P 17/00

[52] U.S. Cl. ........................................ 29/413; 29/412

[58] Field of Search .................. 29/418, 412, 413, 525

[56] References Cited

U.S. PATENT DOCUMENTS

| | | | |
|---|---|---|---|
| 3,624,867 | 12/1971 | Reynolds | 29/413 |
| 3,845,860 | 11/1974 | LaDouceur et al. | 29/412 |
| 4,285,754 | 8/1981 | Dimatted | 29/412 |

*Primary Examiner*—Howard N. Goldberg
*Assistant Examiner*—Steven Nichols
*Attorney, Agent, or Firm*—Edmond T. Patnaude

[57] ABSTRACT

A pocket clip is attached to the tubular barrel of a writing instrument and the rear open end of the barrel is closed by pressing a pocket clip part over the rear end of the barrel and pressing an integral plug portion of the pocket clip part into the opening at the rear end of the barrel.

7 Claims, 5 Drawing Figures

POCKET CLIP FOR A WRITING INSTRUMENT

The present invention relates in general to writing instruments, and it relates in particular to a new and improved method of assembling a pocket clip and closing the rear end of the main body of the instrument.

BACKGROUND OF THE INVENTION

In copending application Ser. No. 529,338 filed on Sept. 6, 1983 by Martin Edward Wacha and Jerry William Digney there is disclosed a writing instrument in which the barrel also functions as the reservoir which contains the ink supply. For esthetic and other reasons the barrel is relatively thin, making it difficult to attach a pocket clip to it. Moreover, since the rear end of the barrel must be open during the ink filling operation, it is desirable to close that opening during the final assembly operation.

SUMMARY OF THE INVENTION

Briefly, in accordance with the present invention a one-piece, molded cap member includes a cup-like body which fits tightly over the rear end of the barrel of the associated writing instrument; an elongated pocket clip which extends forwardly from the body along one side of the barrel; and a rearwardly extending plug which is connected to the body by a thin, annular frangible section.

The cap member is assembled to the barrel by fully inserting the rear end of the barrel into the open front end of the cup-like body and then pressing the plug into the rear open end of the barrel. In a preferred embodiment of the invention, a thin, annular locking rib is provided on the external wall of the plug to prevent spurious removal of the plug from the barrel in which it is assembled.

GENERAL DESCRIPTION OF THE DRAWING

The present invention will be better understood by a reading of the following detailed description taken in connection with the accompanying drawing wherein.

DETAILED DESCRIPTION OF A PREFERRED EMBODIMENT OF THE INVENTION

Figure 1:
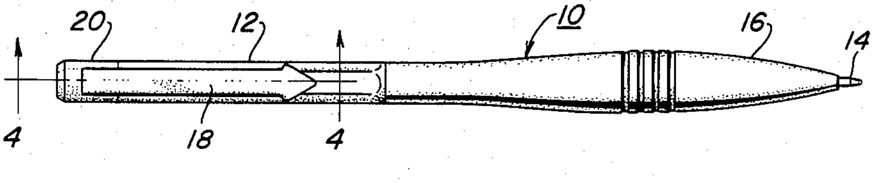
FIG. 1 is a side view of a writing instrument which has been manufactured in accordance with the present invention.

Referring particularly to FIG. 1, a writing instrument 10 of the ball pen type may be seen to include main body or barrel member 12 from the front end of which a ball type writing tip 14 extends. As is explained in the above referenced copending application, a shroud assembly is axially movable on the barrel between the illustrated rearward position exposing the writing tip 14 and a forward position wherein it shrouds or covers the tip. It should be understood that the shroud mechanism forms no part of the present invention.

Figure 4:
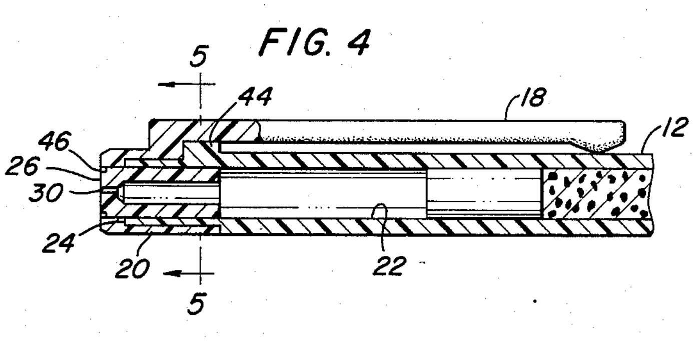
Figure 5:
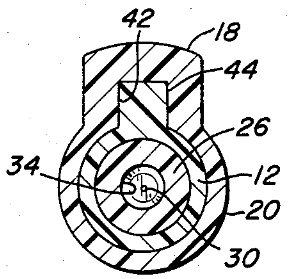
FIG. 5 is a cross-sectional view taken along the line 5—5 of FIG. 4.

In accordance with the present invention and as best shown in FIGS. 1 and 4, the writing instrument 10 includes a pocket clip 18 which extends forwardly along the rear portion of the barrel 12 with the front end portion of the clip spring biased against the side of the barrel as best shown in FIG. 4. As more fully described hereinafter, the pocket clip 18 is an integral part of a molded, cup-like cap memer 20 which is press-fitted over the rear end of the barrel 12. The barrel 12 is tubular and has a cylindrical cavity 22 opening at the rear end 24 of the barrel. An elongated plug 26 is press-fitted into the rear end of the barrel 12. Inasmuch as the rear end of the ink supply must be at ambient pressure, the plug may include a small opening 30 in its rear end of any other air passageway into the rear end of the barrel 12 may be provided including, for example, a longitudinal groove in the exterior surface of the plug 26.

Figure 2:
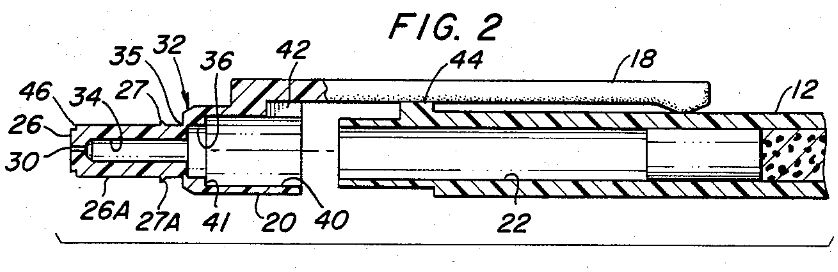
FIGS. 2, 3 and 4 are cross-sectional views showing in sequence the steps used to assemble a pocket clip and reservoir plug to the rear end of the barrel of the writing intrument shown in FIG. 1.

Referring particularly to FIG. 2, a plastic member 32 includes as a single, unitary moldment the cup shaped body 20; the clip 18; and the plug 26. The plug 26 is connected to the body 20 by a thin, frangible, annular wall section 35. The plug 26 could be solid, but in the preferred embodiment it includes a blind, axial hole 34. The rear end of the body 20 is provided with a short opening 36 which is complimentary to the cylindrical exterior surface 26A of the plug 26. The plug 26 is provided with a small, annular locking rib 27 having an inclined ramp surface 27A on its forward side.

The body 20 is further provided with an axial bore 40 which is complimentary to the external surface at the rear of the barrel 12. An annular, forwardly facing shoulder 41 having a radial dimension equal to the wall thickness of the rear portion of the barrel 12 is disposed at the rear end of the bore 40. A longitudinally extending groove 42 is molded in the body 26 beneath the clip 28 and is complimentary to a raised rib 44 on the barrel 12.

Figure 3:
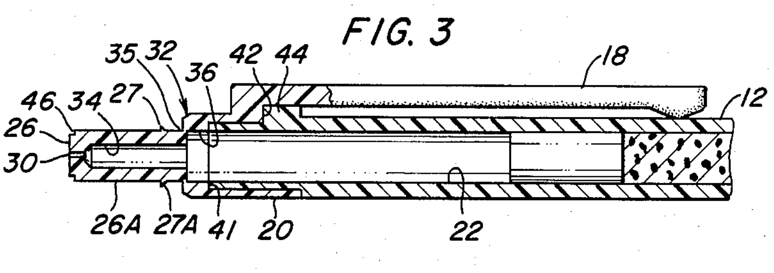

In order to assemble the pocket clip 18 to the barrel 12 and to cover the rear opening in the barrel, the member 32 is pressed onto the rear end of the barrel until the shoulder 41 abuts the rear end of the barrel 12 as shown in FIG. 3. Then an axial thrust is applied to the distal end of the plug 26 to shear the annular, frangible wall section 35 and to push the plug into the rear end of the barrel 12 until the rear end of the plug is aligned with the rear end of the body 20. It may thus be seen that the body 20 is press-fitted onto the barrel and the plug 26 is press-fitted into the opening 36 in the body 20 and into the bore 22 in the barrel 12. The rib 27 assures a tight fit between the plug 26 and the barrel 12 irrespective of normal dimensional tolerances. In the preferred embodiment of the invention an annular groove 46 surrounds the rear end of the plug to camouflage the annular line of demarcation beteen the plug 26 and the body 20.

The entire assembly operation is preferably carried out by automated equipment, and as will be understood by those skilled in the art, during assembly only the part 32 and the barrel 12 need be handled in order to mount the pocket clip to the barrel and to close the rear opening in the barrel.

While the present invention has been described in connection with a particular embodiment thereof, it will be understood by those skilled in the art that many changes and modifications may be made without departing from the true spirit and scope of the present invention. Therefore, it is intended by the appended claims to cover all such changes and modifications which come within the true spirit and scope of this invention.

What is claimed is:

1. A method of affixing a pocket clip and to a writing instrument of the type having a tubular barrel open at the rear end, comprising the steps of molding an integral member having a pocket clip a tubular section which is open at its front end and closed at its rear end by an annular wall and a rearwardly extending plug, said tubular section being dimensioned to be press-fittable over the rear end of said barrel, and said plug being dimensioned to be press-fittable into the open rear end of said barrel, pressing said tubular section of said member onto the rear end of said barrel until said annular wall abuts the rear end of said barrel, and then applying a longitudinally directed force to said rod to fracture said wall to separate said rod from said wall and to push said rod into the open rear end of said barrel.

2. A method according to claim 1 wherein the radial dimension of said annular wall is equal to the wall thickness of said barrel at the rear end thereof.

3. A method according to claim 2 wherein said annular wall is connected to said plug throughout a continuous area surrounding the front end of said plug.

4. A method according to claim 1 wherein said barrel houses an ink supply to which ambient pressure is to be applied comprising the additional steps of molding in said rod a longitudinal channel extending from the front end to the rear end of said rod, whereby said channel provides a passageway communicating the interior of said barrel to the ambient when said rod is positioned within the rear open end of said barrel.

5. A method of enclosing the open rear end of the tubular barrel of a writing instrument, comprising the steps of molding an integral member having a tubular section open at one end and having at its other end an annular wall and a rearwardly extending, centrally disposed plug, said tubular section being dimensioned so as to be slidable over the rear end of said barrel, and said plug being dimensioned so as to be slidable into the open rear end of said barrel, pressing said tubular section onto the rear end of said barrel until said annular wall abuts the rear end of said barrel, and then applying a longitudinal directed force to said plug to separate said rod from the remainder of said member and to push said plug into the rear open end of said barrel.

6. A method according to claim 5 wherein the radial dimension of said annular wall is equal to the wall thickness of said barrel at the rear end thereof.

7. A method according to claim 6 wherein said barrel houses an ink supply to which ambient pressure is to be applied comprising the additional step of molding in said plug a longitudinal channel extending from the front end to the rear end of said plug, whereby said channel provides a passageway communicating the interior of said barrel to the ambient when said plug is positioned within the rear end of said barrel.

* * * * *

UNITED STATES PATENT AND TRADEMARK OFFICE
CERTIFICATE OF CORRECTION

PATENT NO. : 4,506,426

DATED : March 26, 1985

INVENTOR(S) : Brian A. J. Booker

It is certified that error appears in the above—identified patent and that said Letters Patent is hereby corrected as shown below:

Column 4, line 17, "longitudinal" should be -longitudinally-.

Signed and Sealed this

*Second* Day of *July 1985*

[SEAL]

*Attest:*

DONALD J. QUIGG

*Attesting Officer* *Acting Commissioner of Patents and Trademarks*